United States Patent
Patel et al.

(10) Patent No.: US 12,135,938 B2
(45) Date of Patent: Nov. 5, 2024

(54) EXTENDED OPEN INFORMATION EXTRACTION BY IDENTIFYING NESTED RELATIONSHIPS

(71) Applicant: CORASCLOUD, INC., McLean, VA (US)

(72) Inventors: Ajay Patel, Santa Clara, CA (US); Alex Sands, Austin, TX (US)

(73) Assignee: CORASCLOUD, INC., McLean, VA (US)

( * ) Notice: Subject to any disclaimer, the term of this patent is extended or adjusted under 35 U.S.C. 154(b) by 238 days.

(21) Appl. No.: 17/742,258

(22) Filed: May 11, 2022

(65) Prior Publication Data

US 2022/0366135 A1 Nov. 17, 2022

Related U.S. Application Data

(60) Provisional application No. 63/186,969, filed on May 11, 2021.

(51) Int. Cl.
*G06F 40/253* (2020.01)
*G06F 40/279* (2020.01)
*G06F 40/211* (2020.01)

(52) U.S. Cl.
CPC .......... *G06F 40/253* (2020.01); *G06F 40/279* (2020.01); *G06F 40/211* (2020.01)

(58) Field of Classification Search
None
See application file for complete search history.

(56) References Cited

U.S. PATENT DOCUMENTS

| | | | | |
|---|---|---|---|---|
| 5,960,384 | A * | 9/1999 | Brash | G06F 40/205 704/235 |
| 6,965,857 | B1 * | 11/2005 | Decary | G06F 40/205 704/10 |
| 9,620,112 | B2 * | 4/2017 | Hwang | G06F 40/289 |
| 11,531,812 | B2 * | 12/2022 | Xia | G06F 40/284 |
| 2002/0042707 | A1 * | 4/2002 | Zhao | G06F 40/205 704/9 |
| 2007/0027863 | A1 * | 2/2007 | Powell | G06F 16/374 707/999.005 |

(Continued)

*Primary Examiner* — Jesse S Pullias
(74) *Attorney, Agent, or Firm* — SQUIRE PATTON BOGGS (US) LLP (57) ABSTRACT

Systems, methods, apparatuses, and computer program products for natural language processing are provided. One method may include utilizing a trained machine learning model to learn syntax dependency patterns and parts of speech tag patterns of text based on labeled training data. The method may also include contextualizing vector embeddings from a language model for each word in the text, and extracting relationships for a given fragment of the text based on the contextualization. The method may further include resolving relationships between identified verbs based on a plurality of heuristics to identify the syntax dependency patterns, identifying nested relationships, and capturing metadata associated with the nested relationships. The method also includes performing, by utilizing the extracted relationships, at least one of open-domain question answering and natural language question answering, answering questions posed by a user, summarizing documents, or measuring information overlap and information disagreement.

20 Claims, 3 Drawing Sheets

(56) References Cited

U.S. PATENT DOCUMENTS

2014/0163955 A1* 6/2014 Ng Tari ................ G06F 40/205
704/9
2016/0246779 A1* 8/2016 Ho .......................... G06F 40/30

* cited by examiner

FIG. 1

| Barack Hussein Obama II | is | an American politician |
|---|---|---|
| Subject | Predicate | Object |

Relationship

| Barack Hussein Obama II | served | as | the 44th President | | |
|---|---|---|---|---|---|
| | | | | of | the United States |
| Subject | Predicate | Preposition | Object | Preposition | Object |
| | | from | 2009 | | |
| | | Preposition | Object | | |
| | | to | 2017 | | |
| | | Preposition | Object | | |

Inferred Relationship

EXTENDED OPEN INFORMATION EXTRACTION BY IDENTIFYING NESTED RELATIONSHIPS

CROSS-REFERENCE TO RELATED APPLICATION

This application claims the benefit of U.S. Provisional Application No. 63/186,969, filed May 11, 2021. The entire content of the above-referenced application is hereby incorporated by reference.

TECHNICAL FIELD

Some example embodiments may generally relate to natural language processing.

BACKGROUND

Open information extraction has been an important task in text processing, natural language processing, and artificial intelligence in recent years as it is an important step in helping automated computer systems to understand the basic information embedded within text.

SUMMARY

In accordance with some embodiments, a method may include resolving, by a computing device, relationships between identified verbs. The method may further include identifying, by the computing device, nested relationships. The method may further include capturing, by the computing device, metadata associated with the nested relationships.

In accordance with certain embodiments, an apparatus may include means for resolving relationships between identified verbs. The apparatus may further include means for identifying nested relationships. The apparatus may further include means for capturing metadata associated with the nested relationships.

In accordance with various embodiments, an apparatus may include at least one processor and at least one memory including computer program code. The at least one memory and the computer program code may be configured to, with the at least one processor, cause the apparatus to at least resolve relationships between identified verbs. The at least one memory and the computer program code may be further configured to, with the at least one processor, cause the apparatus to at least identify nested relationships. The at least one memory and the computer program code may be further configured to, with the at least one processor, cause the apparatus to at least capture metadata associated with the nested relationships.

In accordance with some embodiments, a non-transitory computer readable medium may be encoded with instructions that may, when executed in hardware, perform a method. The method may include resolving relationships between identified verbs. The method may further include identifying nested relationships. The method may further include capturing metadata associated with the nested relationships.

In accordance with certain embodiments, a computer program product may perform a method. The method may include resolving relationships between identified verbs. The method may further include identifying nested relationships. The method may further include capturing metadata associated with the nested relationships.

In accordance with various embodiments, an apparatus may include circuitry configured to resolve relationships between identified verbs. The circuitry may further be configured to identify nested relationships. The circuitry may further be configured to capture metadata associated with the nested relationships.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for natural language processing is not intended to limit the scope of certain embodiments, but is instead representative of selected example embodiments.

Certain embodiments described herein may have various benefits and/or advantages to overcome disadvantages in current techniques. For example, certain embodiments may require zero-training data given a pre-trained model for accessing syntax dependency trees, parts of speech tags, and tokens, and can easily extend to languages other than English since the heuristics built on recognizing patterns in the syntax dependency tree operate on a universal dependencies framework which is defined in over 100 languages. While some existing systems use only AI-machine learning to develop rules, some embodiments discussed herein may use manual coding/rules and AI machine learning in English, thereby improving precision and performance.

Figure 1:
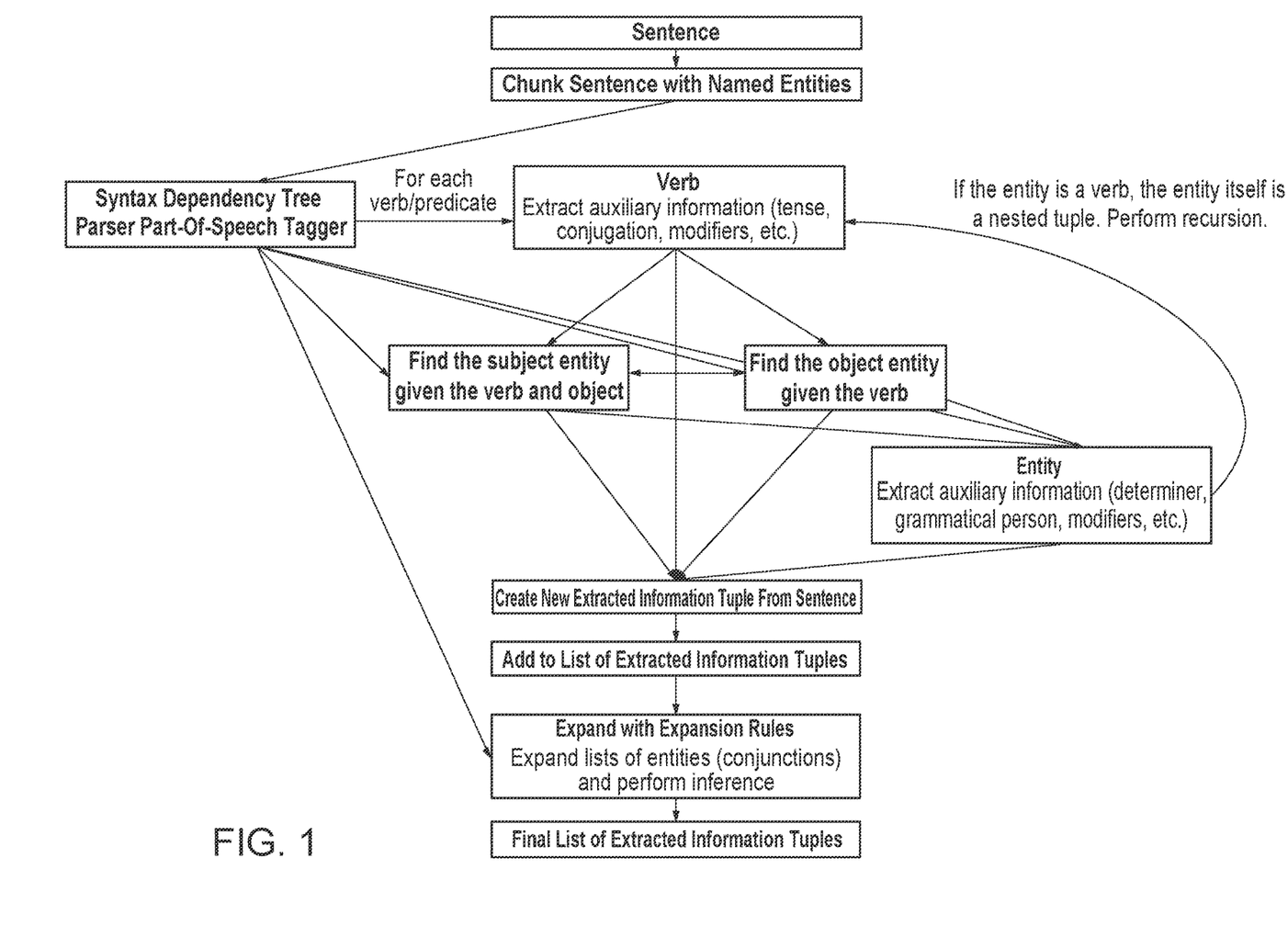
FIG. 1 illustrates an example of a high-level diagram of a language engine according to various embodiments.

In addition, some embodiments of the open information extraction system may more accurately represent complex sentences and information than traditional open information extraction systems, limited to tuples of size three to ten, are unable to represent faithfully, such as illustrated in FIG. 1. Furthermore, some embodiments may not utilize neural networks to perform open information extraction given syntax dependency trees, parts of speech tags, and tokens, which is more explainable and adaptable. Particular heuristics which led to an output may be traced, and may be removed and changed if they lead to a failure scenario. Thus, certain embodiments discussed below are directed to improvements in computer-related technology.

Open information extraction may assist in extracting structured information and facts from target sentences in the form of tuples, which may contain any number of subjects, predicates, and objects. Some embodiments described herein may relate to a method for open information, using a number of heuristics that recognize patterns over a syntax dependency tree, parts of speech tags, and tokens. Traditional subject, predicate, and object tuple extraction techniques may be enhanced with richer information, adding more arguments for constructs like qualifiers, question words, and prepositions. Entities such as subjects and objects may be parsed at a deeper level than traditional open information extraction systems to label determiners, possessives, and other grammatical prefixes and suffixes. Predicates may also be processed in a similar manner, labelling grammatical prefixes and suffixes specific to the usage of the predicate verb in the target sentence. Certain embodiments may also recursively process tuples such that an argument in a tuple may be a tuple itself.

As summarized above, some embodiments may relate to a parser of natural language text that performs open information extraction with an extended tuple representation using a large number of heuristics that recognize patterns over a syntax dependency tree, parts of speech tags, and tokens. After an initial round of extraction, certain embodiments may perform expansion to create new tuples from the extracted tuples, which may be performed in any of three ways. The first is by recursively expanding to multiple tuples if an entity is a "compound entity" or a list of multiple entities. The second is by combining two tuples with entities connected by appositive syntax to form a new "inferred" tuple. The third is by combining two tuples with entities connected by copula syntax to form a new "inferred" tuple.

Figure 2:
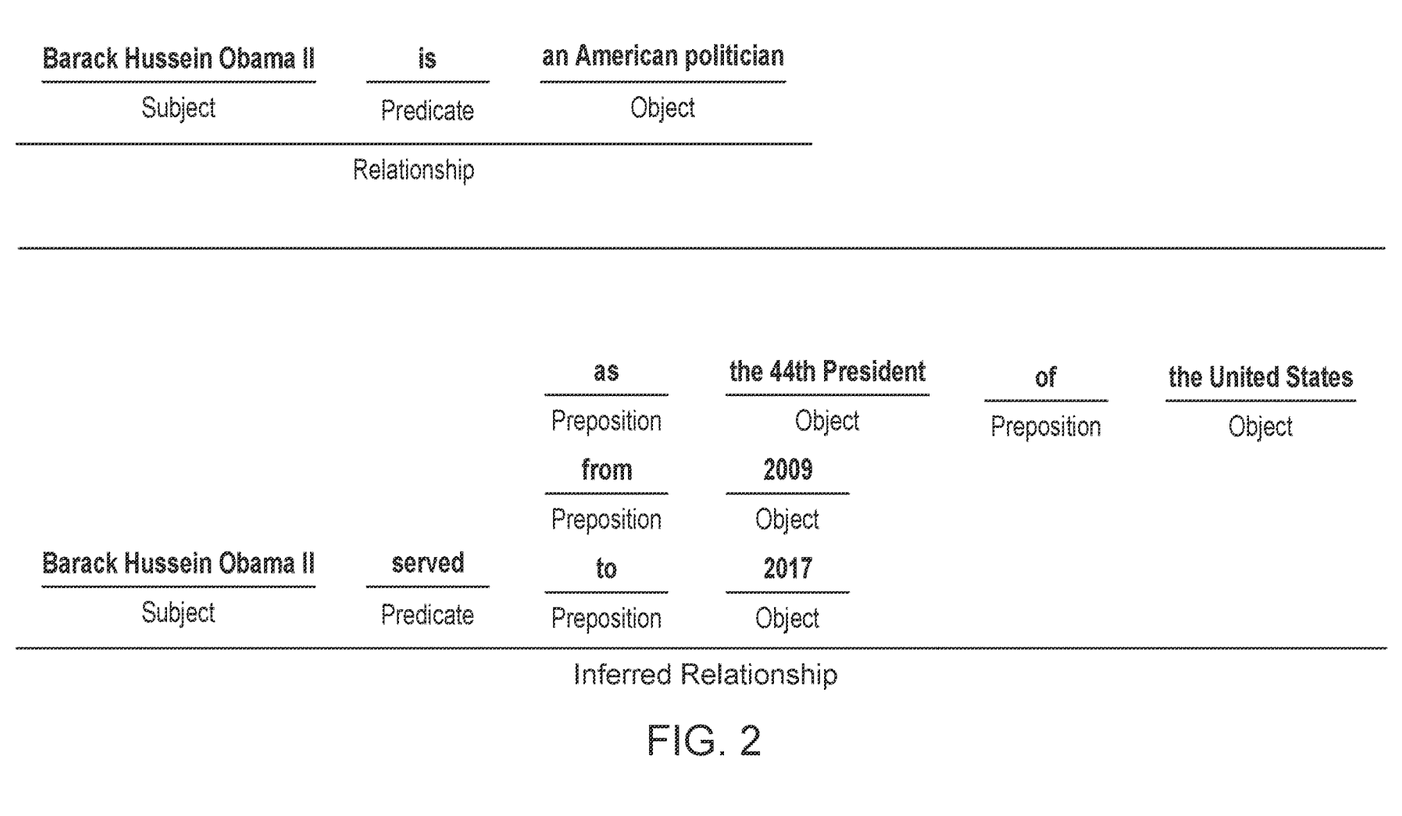
FIG. 2 illustrates an example of a visualization of the output of a language engine from a sentence according to some embodiments.

As illustrated in FIG. 2, open information extraction may enable open-domain question answering. For example, to answer a question like "Who invented the lightbulb?," a computer could search for the word "invent" in a passage of text that contains the answer. If the object of the verb "invent" was "lightbulb," then the subject of the verb "invent" may be the answer. It has proven more difficult, however, for a computer to find the subject and object of the verb "invent" in an automated fashion due the millions of variations of sentence formations possible in the grammar of most modern languages, including English.

While open-domain question answering may be applied in open information extraction, it is not the only application. Even if a user of the system is not looking to perform open-domain question answering, a system that can utilize open information extraction to understand information in a sentence ("who" did "what" to "whom") can use that to facilitate many other tasks since reading and understanding information embedded in text is the basis for many tasks and jobs that humans perform. Open information extraction includes disadvantages due to the lack of training data and end-to-end machine learning models (e.g., neural networks) performing poorly on outputting highly structured, yet variable, outputs, including output of certain embodiments of the claimed invention. Rather, certain embodiments of the claimed invention may perform these tasks, which are central in helping artificial intelligence understand information about the world embedded in text on the internet, text on physical media, and text transcribed from spoken language.

Figure 3:
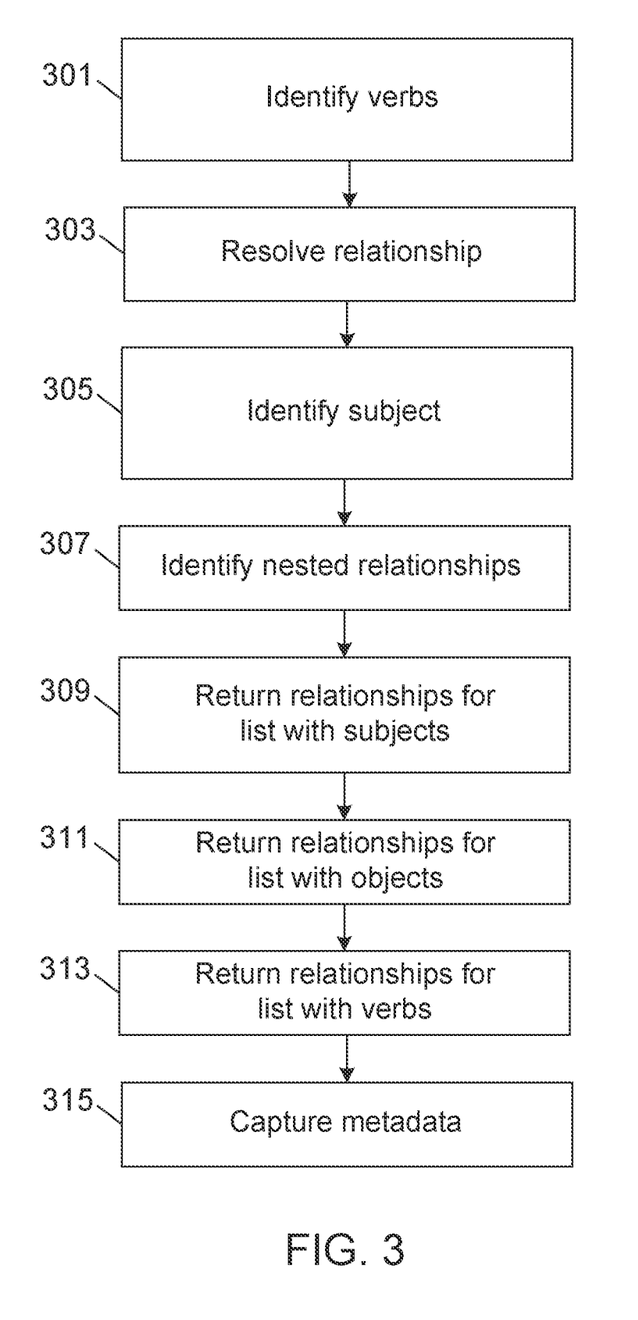
FIG. 3 illustrates an example of a flow diagram of a method according to various embodiments.

FIG. 3 illustrates an example of a flow diagram of a method that may be performed, for example, by a language engine on a computing device. In some example embodiments, the language engine may utilize trained machine learning models and/or artificial intelligence techniques to learn new syntax dependency patterns and parts of speech tag patterns based on labelled training data examples. As an example, machine learning architectures used in this process may include, but are not limited to, recurrent neural networks (RNNs), long short term memory networks (LSTMs), transformer networks, and graph neural networks (GNN). In addition, learned rules may be probabilistic or deterministic in nature.

In various example embodiments, by using a trained attention-based machine learning model, the language engine may consider or condition on word vector embeddings (such as word2vec or GloVe embeddings) or contextualized vector embeddings from large language models like BERT for each word before determining whether to apply a syntax dependency pattern or parts of speech tag pattern to extract a relationship for any given fragment of text.

In addition, through a trained machine learning decision model, the language engine may consider the surrounding words in a small window around a given word before determining whether to apply a syntax dependency pattern or parts of speech tag pattern to extract a relationship for any given fragment of text. Machine learning may also allow the language engine to provide a numerical score of confidence between 0 and 100 representing the likelihood of an extracted relationship being a high-quality, accurate extraction.

Once extracted, any given extracted relationship may be embedded into a continuous vector embedding representation through a trained, self-supervised autoencoder machine learning model. These continuous vector embedding representations may be used in place of relationships in downstream use cases, such as the semantic similarity measurement between two or more documents.

At 301, text may be scanned to identify all verbs using parts of speech tags labelled as "VB." At 303, for each identified verb, a relationship is resolved, such as a tuple in open information extraction. For example, the object of the verb may be identified, where a variety of heuristics may be used to identify patterns of syntax dependencies and identify the correct object for the given verb. At 305, the identified verb and object may be used to identify the subject. For example, a variety of heuristics may be used to identify patterns of syntax dependencies to determine the correct subject for the given verb and object. As an example, the "variety of heuristics" may be learned using machine learning/artificial intelligence over a dataset of labelled examples.

In certain example embodiments, relationships may be extracted from large amounts of documents on scales that a human reader would not be able to consume, for example, over popular public pages on the Internet. The relationships extracted by this language engine may form a graph structure between entities. Entities may be related together with predicates and other semantic and syntactic structures labelled by the language engine. The graph representations of the relationships in text may be pipelined to a graph database (e.g., "knowledge graph"). This knowledge stored in this graph database may be used for business use cases such as analytics, insights, question answering, information retrieval, etc. through the use of graph queries.

In various example embodiments, by operating on universal dependencies and parts of speech tags, the language engine can extract relationships from documents in 100+ different languages something no single human performer could do. Extracted relationships may be utilized to perform open-domain question answering and natural language question answering from a large set of documents by performing a graph query over the graph-structured data of relationships extracted from documents of text. Extracted relationships may also be utilized to answer questions posed by a user in a virtual assistant or chatbot application.

In certain example embodiments, extracted relationships may be utilized to summarize documents by filtering to keep only salient information with high frequency or importance as scored by a machine learning model trained on a summarization dataset. Extracted relationships may also be utilized to measure information overlap and information disagreement between two or more documents as a method of determining semantic similarity.

At 307, if the "subject" and "object" are verbs, nested relationships may be recursively found, and relationships within relationships may be determined.

At 309, if the subject is part of a list ("John and Bob went to the mall.") as determined using the "conj" universal dependency, two or more relationships may be returned. At 311, if the object is part of a list ("John bought a TV and a Xbox.") as determined using the "conj" universal dependency, two or more relationships may be returned. At 313, if the verb is part of a list ("John went to the mall and bought a TV.") as determined using the "conj" universal dependency, two or more relationships may be returned.

At 315, if the verb is negated ("John did not go to the mall") as determined using the "neg" universal dependency, the information is captured as metadata for the relationship. As an example, if the verb has prepositions attached ("Barack Obama was president of the United States from 2009 to 2017") as determined using the "prep" universal dependency, the results may include subject: "Barack Obama," verb: "was," and object: "president." In some embodiments, prepositions may be identified as "of" "United States;" "from" "2009;" and "to" "2017." If the preposition is in a list as determined using the "conj" universal dependency, two or more relationships ("John went to the mall and the park.") may be returned.

In some embodiments, auxiliary metadata information may be extracted. For example, in certain embodiments, the tense of the predicate may be extracted, which may include any of infinitive, continuous, past passive, present simple, past simple, future simple, present continuous, past continuous, future continuous, present perfect, past perfect, future perfect, present perfect continuous, past perfect continuous, and/or future perfect continuous. These may be determined using both information found in the parts of speech tag for the predicate as well as "cop," "aux," or "dep" universal dependency relationships.

In various embodiments, auxiliary qualifiers of the predicate may be resolved, which may include "dare," "need," "can," "could," "may," "might," "must," "shall," "should," "would," and "to." In some embodiments, verb conjugation of the predicate may be resolved, which may include infinitive, present singular, present plural, past, past participle, and continuous. These may be determined using both information found in the parts of speech tag for the predicate as well as "cop," "aux," or "dep" universal dependency relationships.

In certain embodiments, phrasal particle of the predicate may be found using the "prt," "aux," or "dep" universal dependencies, for example, "He grew up in California." In this example, "up" is a phrasal particle of the verb "grew." Verb modifiers of the predicate may also be obtained, including attached verbs using the "advmod" universal dependency. Proper nouns of entities may also be resolved, such as using heuristic methods to determine whether the subject or object is a proper noun using a provided list of named entities along with their frequency of usage within the context of other words.

In some embodiments, determiners of the entities may be found as determined using the "dep" universal dependency, such as "a," "an," "the," "this," "that," "these," "those," "some," "any," "all," "each," and "every." Furthermore, grammatical person of entities may be found, including first singular, second singular, third singular, first plural, and third plural using information from the parts of speech tag for the entity. In addition, entity modifiers of entities may be found using "amod," "aux," or "dep" universal dependencies, which may simply be modifiers. Furthermore, the possessive owner of entities may be obtained using the "poss" universal dependency, for example, the possessive owner may be recursively defined as an entity itself. Some embodiments may include named entity recognition, where text may be collected before tokenizing using a set of named entities extracted from the web to retrieve higher quality syntax dependency trees.

Various embodiments may perform expansion to create new tuples from the extracted tuples. For example, multiple tuples may be recursively expanded to if an entity is a "compound entity" or a list of multiple entities. Two tuples may be combined with entities connected by appositive syntax to form a new "inferred" tuple. Two tuples may be combined with entities connected by copula syntax to form a new "inferred" tuple.

In various embodiments, AI and training sets may be used to create rules for supporting multi-lingual content, including the underlying universal grammar. For example, heuristics may recognize patterns over a syntax dependency tree, parts of speech tags, and tokens. Dynamic rules may be generated based on the characteristics of such training sets or user requirements. This may include utilizing qualifiers, question words, and prepositions. Grammatical prefixes and suffixes specific may also be labelled to the usage of the predicate verb in the target sentence.

Supplemental industry specific rules may be generated for applying to the data. Rules may also be generated by a human, such as by recursively expanding to multiple tuples if an entity is a "compound entity" or a list of multiple entities. Two tuples may be combined with entities connected by appositive syntax to form a new "inferred" tuple, and/or two tuples may be combined with entities connected by copula syntax to form a new "inferred" tuple.

In various embodiments, temporal and other context based on specific requirements may be identified. This may include recursively processing tuples, which may contain subjects, predicates, and/or objects. Determiners, possessives, and other grammatical prefixes and suffixes may be labelled, as well as grammatical prefixes and suffixes specific to the usage of the predicate verb in the target sentence.

Certain embodiments may be implemented in an apparatus, which may include a processor for processing information and executing instructions or operations. The processor may be any type of general or specific purpose processor. In fact, the processor may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. It should be understood that, in certain embodiments, the apparatus may include two or more processors that may form a multiprocessor system that may support multiprocessing. In certain embodiments, the multiprocessor system may be tightly coupled or loosely coupled (e.g., to form a computer cluster). The processor may perform functions associated with the operation of the apparatus.

The apparatus may further include or be coupled to a memory (internal or external), which may be coupled to the processor, for storing information and instructions that may be executed by the processor. The memory may be one or more memories and of any type suitable to the local application environment, and may be implemented using any suitable volatile or non-volatile data storage technology such as a semiconductor-based memory device, a magnetic memory device and system, an optical memory device and system, fixed memory, and/or removable memory. For example, the memory can be comprised of any combination of random access memory (RAM), read only memory (ROM), static storage such as a magnetic or optical disk, hard disk drive (HDD), or any other type of non-transitory machine or computer readable media. The instructions stored in the memory may include program instructions or computer program code that, when executed by the processor, enable the apparatus to perform tasks as described herein.

In an embodiment, the apparatus may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by the processor and/or the apparatus.

In some embodiments, the apparatus may also include or be coupled to one or more antennas for transmitting and receiving signals and/or data. The apparatus may further include or be coupled to a transceiver configured to transmit and receive information. Additionally or alternatively, in some embodiments, the apparatus may include an input and/or output device (I/O device).

In an embodiment, the memory may store software modules that provide functionality when executed by the processor. The modules may include, for example, an operating system that provides operating system functionality for the apparatus. The memory may also store one or more functional modules, such as an application or program, to provide additional functionality for the apparatus. The components of the apparatus may be implemented in hardware, or as any suitable combination of hardware and software.

According to some embodiments, the processor and the memory may be included in or may form a part of processing circuitry or control circuitry. In addition, in some embodiments, the transceiver may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

According to certain embodiments, the apparatus may be controlled by the memory and the processor to perform the functions associated with any of the embodiments described herein or in the attached materials.

Although some embodiments are described using specific examples, such as WINDOWS products and/or services, certain embodiments described herein are not limited to these specific examples. For example, certain embodiments described herein are applicable to any computing device and/or operating system, regardless of manufacturer, supplier, etc.

The features, structures, or characteristics of example embodiments described throughout this specification may be combined in any suitable manner in one or more example embodiments. For example, the usage of the phrases "various embodiments," "certain embodiments," "some embodiments," or other similar language throughout this specification refers to the fact that a particular feature, structure, or characteristic described in connection with an example embodiment may be included in at least one example embodiment. Thus, appearances of the phrases "in various embodiments," "in certain embodiments," "in some embodiments," or other similar language throughout this specification does not necessarily all refer to the same group of example embodiments, and the described features, structures, or characteristics may be combined in any suitable manner in one or more example embodiments.

Additionally, if desired, the different functions or procedures discussed above may be performed in a different order and/or concurrently with each other. Furthermore, if desired, one or more of the described functions or procedures may be optional or may be combined. As such, the description above should be considered as illustrative of the principles and teachings of certain example embodiments, and not in limitation thereof.

One having ordinary skill in the art will readily understand that the example embodiments discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of the example embodiments.

Partial Glossary

AI Artificial Intelligence
ASIC Application-Specific Integrated Circuit
DSP Digital Signal Processor
FPGA Field-Programmable Gate Array
GNN Graph Neural Networks
HDD Hard Disk Drive
I/O Input/Output
LSTM Long Short Term Memory Network
ML Machine Learning
RAM Random Access Memory
RNN Recurrent Neural Network
ROM Read Only Memory
USB Universal Serial Bus

We claim:

1. A method, comprising:
    utilizing a trained machine learning model executed in a computing device to learn syntax dependency patterns and parts of speech tag patterns of text based on labeled training data;
    contextualizing, by the computing device executing the trained machine learning model, vector embeddings from a language model for each word in the text before determining whether to apply a syntax dependency pattern or parts of a speech tag pattern;
    extracting, by the computing device executing the trained machine learning model, relationships for a given fragment of the text based on the contextualization;

resolving, by the computing device executing the trained machine learning model, relationships between a plurality of identified verbs based on a plurality of heuristics to identify the syntax dependency patterns;
identifying, by the computing device executing the trained machine learning model, at least one nested relationship;
capturing, by the computing device executing the trained machine learning model, metadata associated with the at least one nested relationship; and
performing, by utilizing the extracted relationships via the computing device executing the trained machine learning model, at least one of
open-domain question answering and natural language question answering,
answering questions posed by a user in a virtual assistant or chatbot application,
summarizing documents by filtering to keep salient information with a high frequency or importance, or
measuring information overlap and information disagreement between two or more documents.

2. The method of claim 1, further comprising:
scanning, by the computing device executing the trained machine learning model, the text to identify at least one verb.

3. The method of claim 1, further comprising:
identifying, by the computing device executing the trained machine learning model, at least one subject.

4. The method of claim 1, further comprising:
identifying, by the computing device executing the trained machine learning model, at least one relationship between any of subjects, objects, and verbs.

5. The method of claim 1, further comprising:
returning, by the computing device executing the trained machine learning model, a plurality of relationships in response to a subject being part of a list.

6. The method of claim 1, further comprising:
returning, by the computing device executing the trained machine learning model, a plurality of relationships in response to an object being part of a list.

7. The method of claim 1, further comprising:
returning, by the computing device executing the trained machine learning model, a plurality of relationships in response to a verb of the plurality of identified verbs being part of a list.

8. An apparatus, comprising:
at least one processor; and
at least one memory including computer program code,
wherein the at least one memory and the computer program code are configured to, with the at least one processor, cause the apparatus at least to:
utilize a trained machine learning model executed in the apparatus to learn syntax dependency patterns and parts of speech tag patterns of text based on labeled training data;
contextualizing, by executing the trained machine learning model, vector embeddings from a language model for each word in the text before determining whether to apply a syntax dependency pattern or parts of a speech tag pattern;
extracting, by executing the trained machine learning model, relationships for a given fragment of the text based on the contextualization;
resolve, by executing the trained machine learning model, relationships between a plurality of identified verbs;
identify, by executing the trained machine learning model, at least one nested relationship;
capture, by executing the trained machine learning model, metadata associated with the at least one nested relationship; and
perform, by utilizing the extracted relationships via execution of the trained machine learning model, at least one of
open-domain question answering and natural language question answering,
answer questions posed by a user in a virtual assistant or chatbot application,
summarize documents by filtering to keep salient information with a high frequency or importance, or
measure information overlap and information disagreement between two or more documents.

9. The apparatus of claim 8, wherein the at least one memory and the computer program code are further configured to, with the at least one processor, cause the apparatus at least to:
scan, by executing the trained machine learning model, the text to identify at least one verb.

10. The apparatus of claim 8, wherein the at least one memory and the computer program code are further configured to, with the at least one processor, cause the apparatus at least to:
identify, by executing the trained machine learning model, at least one subject.

11. The apparatus of claim 8, wherein the at least one memory and the computer program code are further configured to, with the at least one processor, cause the apparatus at least to:
identify, by executing the trained machine learning model, at least one relationship between any of subjects, objects, and verbs.

12. The apparatus of claim 8, wherein the at least one memory and the computer program code are further configured to, with the at least one processor, cause the apparatus at least to:
return, by executing the trained machine learning model, a plurality of relationships in response to a subject being part of a list.

13. The apparatus of claim 8, wherein the at least one memory and the computer program code are further configured to, with the at least one processor, cause the apparatus at least to:
return, by executing the trained machine learning model, a plurality of relationships in response to an object being part of a list.

14. The apparatus of claim 8, wherein the at least one memory and the computer program code are further configured to, with the at least one processor, cause the apparatus at least to:
return, by executing the trained machine learning model, a plurality of relationships in response to a verb of the plurality of identified verbs being part of a list.

15. A non-transitory computer-readable medium comprising program instructions stored thereon which, when executed by a computer, cause the computer to execute a computer process comprising:
utilizing a trained machine learning model to learn syntax dependency patterns and parts of speech tag patterns of text based on labeled training data;
contextualizing, via the trained machine learning model, vector embeddings from a language model for each word in the text before determining whether to apply a syntax dependency pattern or parts of a speech tag pattern;

extracting, via the trained machine learning model, relationships for a given fragment of the text based on the contextualization;
resolving, via the trained machine learning model, relationships between a plurality of identified verbs;
identifying, via the trained machine learning model, at least one nested relationship;
capturing, via the trained machine learning model, metadata associated with the at least one nested relationship; and
performing, by utilizing the extracted relationships via the trained machine learning model, at least one of
open-domain question answering and natural language question answering,
answering questions posed by a user in a virtual assistant or chatbot application,
summarizing documents by filtering to keep salient information with a high frequency or importance, or
measuring information overlap and information disagreement between two or more documents.

16. The non-transitory computer-readable medium of claim 15, further comprising program instructions stored thereon which, when executed by a computer, cause the computer to execute a computer process comprising:
scanning, via the trained machine learning model, the text to identify at least one verb.

17. The non-transitory computer-readable medium of claim 15, further comprising program instructions stored thereon which, when executed by a computer, cause the computer to execute a computer process comprising:
identifying, via the trained machine learning model, at least one subject.

18. The non-transitory computer-readable medium of claim 15, further comprising program instructions stored thereon which, when executed by a computer, cause the computer to execute a computer process comprising:
identifying, via the trained machine learning model, at least one relationship between any of subjects, objects, and verbs.

19. The non-transitory computer-readable medium of claim 15, further comprising program instructions stored thereon which, when executed by a computer, cause the computer to execute a computer process comprising:
returning, via the trained machine learning model, a plurality of relationships in response to a subject being part of a list.

20. The non-transitory computer-readable medium of claim 15, further comprising program instructions stored thereon which, when executed by a computer, cause the computer to execute a computer process comprising:
returning, via the trained machine learning model, a plurality of relationships in response to an object being part of a list.

* * * * *